United States Patent [19]

Cox et al.

[11] 4,341,264

[45] Jul. 27, 1982

[54] WELLHEAD SHEARING APPARATUS

[75] Inventors: Fern H. Cox, Houston; Irwin Rosenhauch, Rockwall, both of Tex.

[73] Assignee: Cameron Iron Works, Inc., Houston, Tex.

[21] Appl. No.: 197,115

[22] Filed: Oct. 15, 1980

[51] Int. Cl.³ .................... E21B 29/08; E21B 33/06
[52] U.S. Cl. ......................................... 166/55; 72/464; 83/694; 251/1 A
[58] Field of Search ................... 166/55, 55.1; 72/464; 83/694; 37/141 R, 142 A; 251/1 A

[56] References Cited

U.S. PATENT DOCUMENTS

| | | | |
|---|---|---|---|
| 3,736,982 | 6/1973 | Vujasinovic | 166/55 |
| 3,834,764 | 9/1974 | Krekeler | 299/88 X |
| 3,888,027 | 6/1975 | Toews | 172/701.3 X |
| 3,946,806 | 3/1976 | Meynier | 166/55 |
| 4,081,027 | 3/1978 | Nguyen | 72/464 |
| 4,240,503 | 12/1980 | Holt, Jr. et al. | 166/55 |

*Primary Examiner*—Stephen J. Novosad
*Attorney, Agent, or Firm*—Vinson & Elkins

[57] ABSTRACT

A wellhead shearing apparatus suitable for use on oil and gas wells having hydrogen sulfide. The apparatus includes a body with a vertical bore and opposed guideways extending from the bore. A ram assembly with two rams, means for moving each ram in the guideways together with the bore for shearing pipe in the bore and apart for other well operations. One ram has an upper cutting blade and the other ram has a lower cutting blade, which has a hard metal insert providing its cutting edge and the upper cutting blade has a hard cutting edge. The rams are of steel having a maximum hardness of 24 to 26 Rockwell C and the insert has substantially greater hardness. The hard cutting edges of both blades are isolated from the sour gas when the blades are under stress as a result of sealing across the vertical bore.

9 Claims, 6 Drawing Figures

WELLHEAD SHEARING APPARATUS

BACKGROUND

Considerable difficulty has been encountered in wellhead shearing devices on wells containing sour gas such as hydrogen sulfide because, while the cutting edges for adequate shearing should have a hardness greater than 24 to 26 Rockwell C, alloy steel of such high hardness is embrittled by exposure to hydrogen sulfide when under stress. This is commonly referred to as sulfide stress cracking.

U.S. Pat. No. 4,081,027 proposes to solve this problem by having the structural components with a maximum hardness of 22 Rockwell C and hard facing the cutting edges. The structure shown in FIG. 5 of this patent has been tested with only minimal success.

In other fields, it is well known to insert hard metal into the tip of tools to provide a wear resistant and hard metal cutting surface as shown in U.S. Pat. Nos. 3,888,027 and 3,834,764.

However, even with the knowledge of such prior art, difficulties continue to be encountered in wellhead shearing devices which are exposed to sour gas.

SUMMARY

The present invention provides an improved wellhead shearing apparatus including a body with a vertical bore and opposed guideways extending outward from the bore, a ram having a cutting blade in each guideway, a hard metal insert secured in a recess along the forward cutting edge of at least one of the cutting blades, and sealing means, effective on closing of the rams, for isolating the hard metal insert from the well fluids in the wellhead and for sealing the well bore.

An object of the present invention is to provide an improved wellhead shearing apparatus which will withstand sour gas without decreasing its shearing ability.

Another object is to provide an improved wellhead shearing apparatus with durable cutting edges in which all but the cutting edges are of steel having a maximum hardness of 24 to 26 Rockwell C.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENTS

Figure 1:
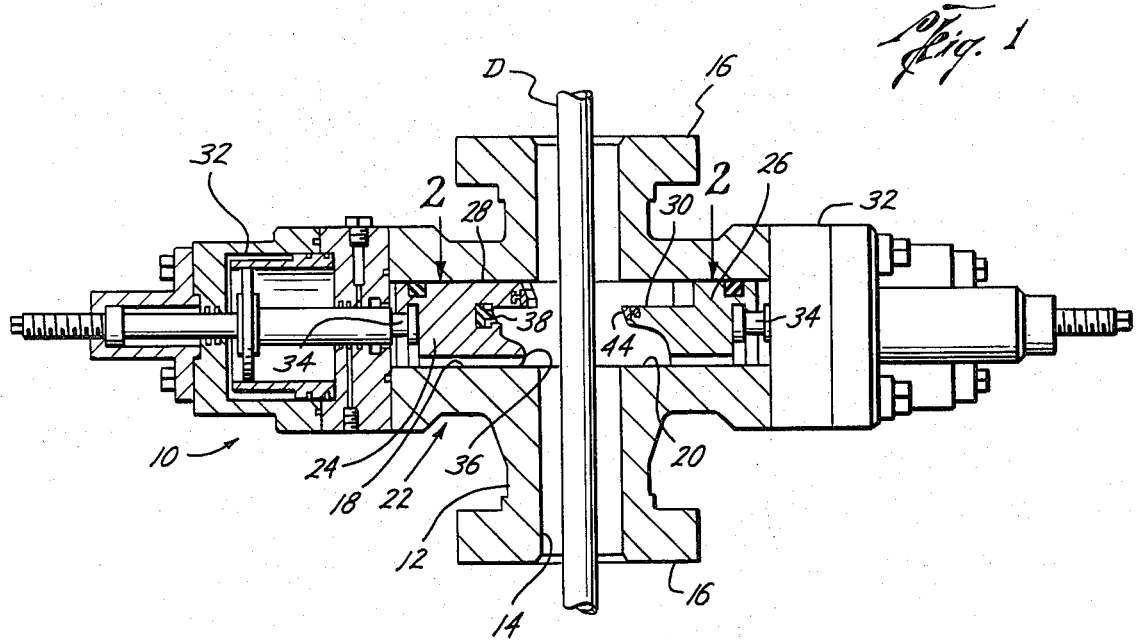
FIG. 1 is an elevation view, partly in section, of the improved wellhead shearing apparatus of the present invention.

In FIG. 1, shearing apparatus 10 of the present invention is shown as a shear ram type blowout preventer. It includes body 12 having vertical bore 14 extending therethrough with upper and lower flanges 16 to provide connection into a blowout preventer stack in a wellhead. Ram guideways 18 and 20 extend through body 12 from opposite sides of bore 14. Ram assembly 22 includes first ram 24 and second ram 26 and each ram is mounted in its guideway. Ram 24 includes upper cutting blade 28 and ram 26 includes lower cutting blade 30. Actuators 32 are connected to rams 24 and 26 by rods 34 and move the rams inwardly to shear a drill string D in bore 14 as shown in FIG. 4 and outwardly to the retracted position shown in FIG. 1.

Ram 24 includes shoulder 36 facing bore 14 and sealing strip 38 positioned in the recess between upper cutting blade 28 and shoulder 36.

Figure 3:
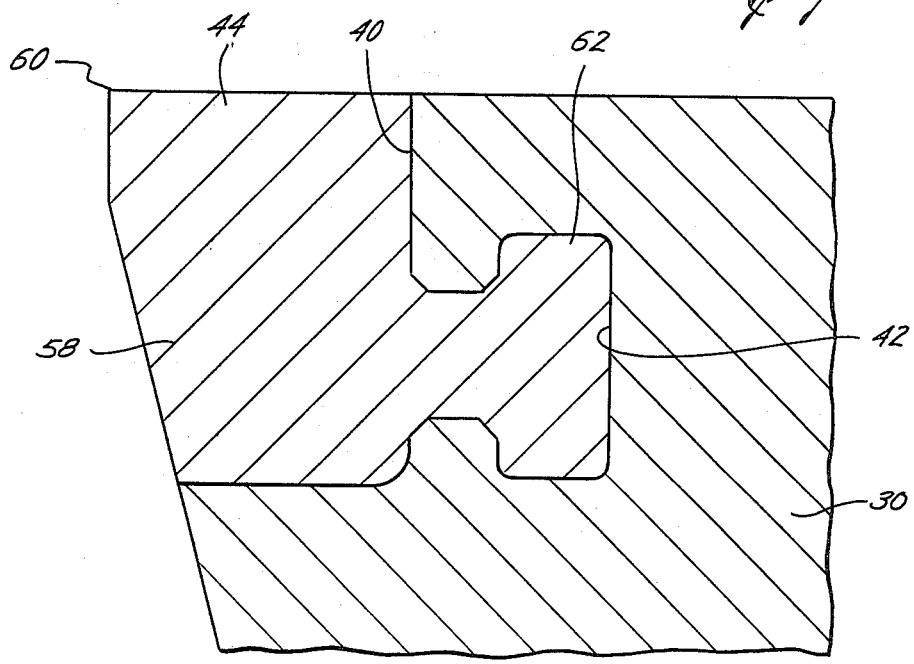
FIG. 3 is a detailed sectional view taken along line 3—3 in FIG. 2 of the insert in the lower cutting blade providing the hard metal cutting edge.
Figure 4:
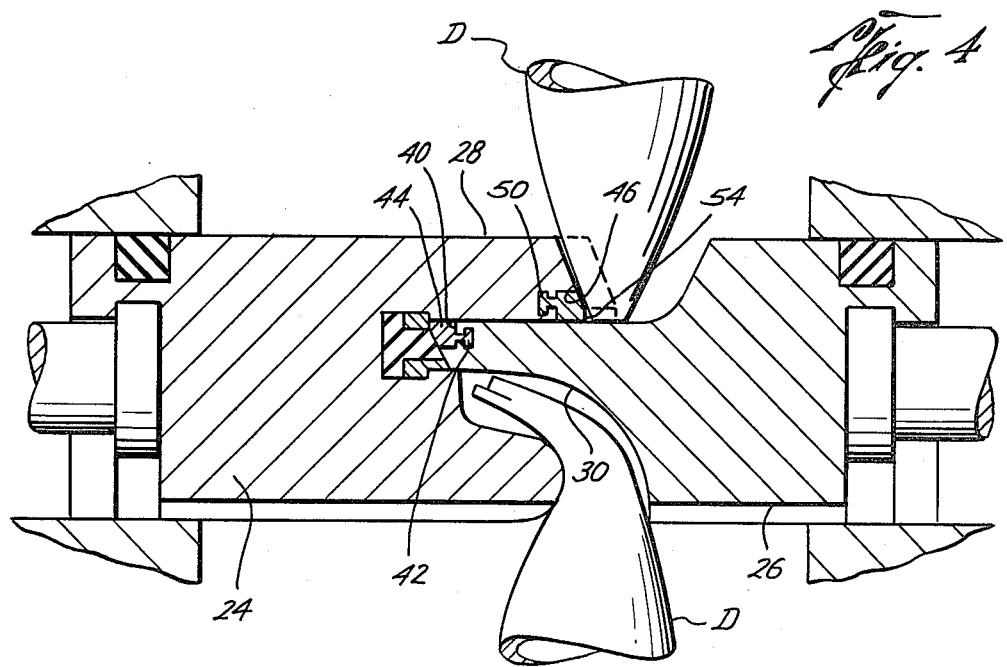
FIG. 4 is a detailed sectional view of the shearing of pipe by the preferred form of shearing apparatus of the present invention.

As shown in FIGS. 3 and 4, cutting blade 30 has recess 40 along its cutting edge and T-slot 42 in communication with the recess and extending parallel thereto. Hard metal insert 44 is inserted into recess 40 and T-slot 42 and is secured therein by suitable means, such as an epoxy bonding agent.

Figure 2:
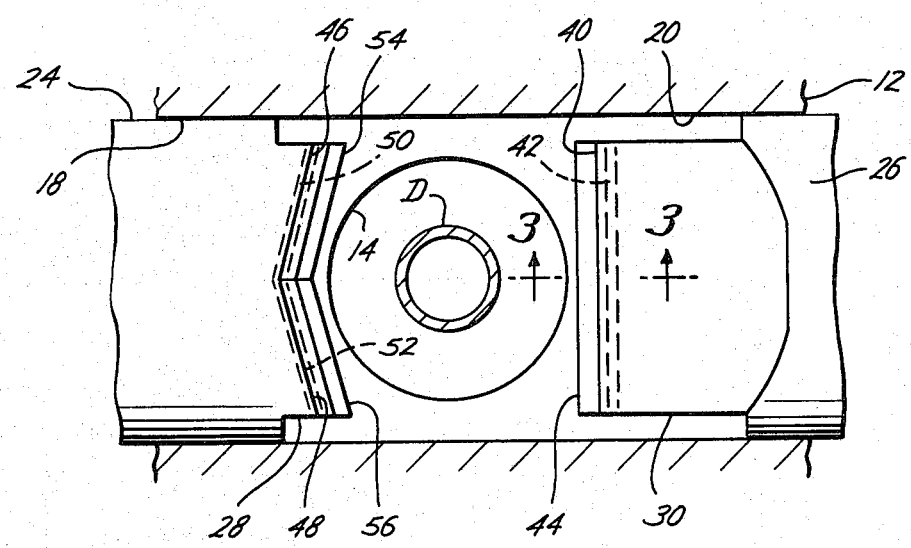
FIG. 2 is a plan view of the device shown in FIG. 1 with portions broken away to show the rams and guideways.

As shown in FIGS. 2 and 4, cutting blade 28 has recesses 46 and 48 along its cutting edge forming a V-shape and T-slots 50 and 52 in communication with recesses 46 and 48, respectively. Hard metal inserts 54 and 58 are inserted into their respective recesses and T-slots from the sides.

FIG. 3 is a sectional view of insert 44 which is similar to inserts 54 and 56. Insert 44 has a body 58 with square corner 60 being the cutting edge of cutting blade 30 and T-shaped projection 62 which fits tightly into T-slot 42. Insert 44 is inserted into recess 40 and T-slot 42 from the end of cutting blade 30 and is secured therein with a suitable means, such as epoxy bonding agent. Similarly, inserts 54 and 56 are inserted into blade 28 from each side and are secured therein by suitable means such as an epoxy bonding agent.

When drill pipe is sheared with shearing apparatus 10, the forward edge of cutting blade 30 engages sealing strip 38 as best shown in FIG. 4. The face of blade 30 below insert 44 seals against sealing strip 38 so that whenever the rams are closed hard metal inserts 44, 54 and 56 are not exposed to the high pressure sour gas laden drilling fluids and thus are not subject to sulfide stress cracking as they are isolated from such fluids.

Figure 5:
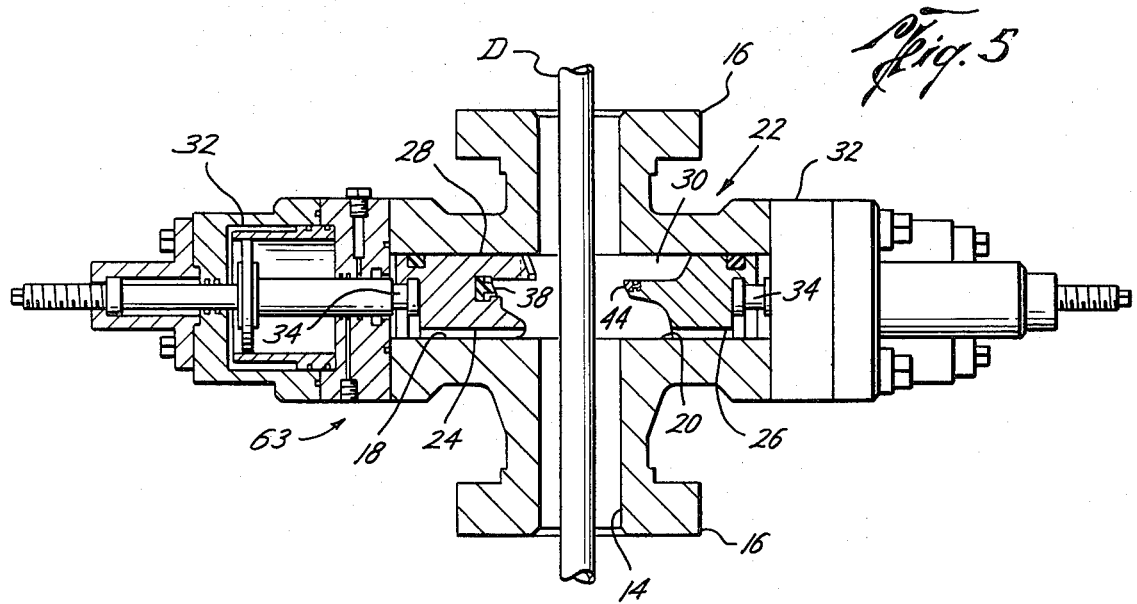
FIG. 5 is an elevation view, partly in section, of a modified form of shearing apparatus.
Figure 6:
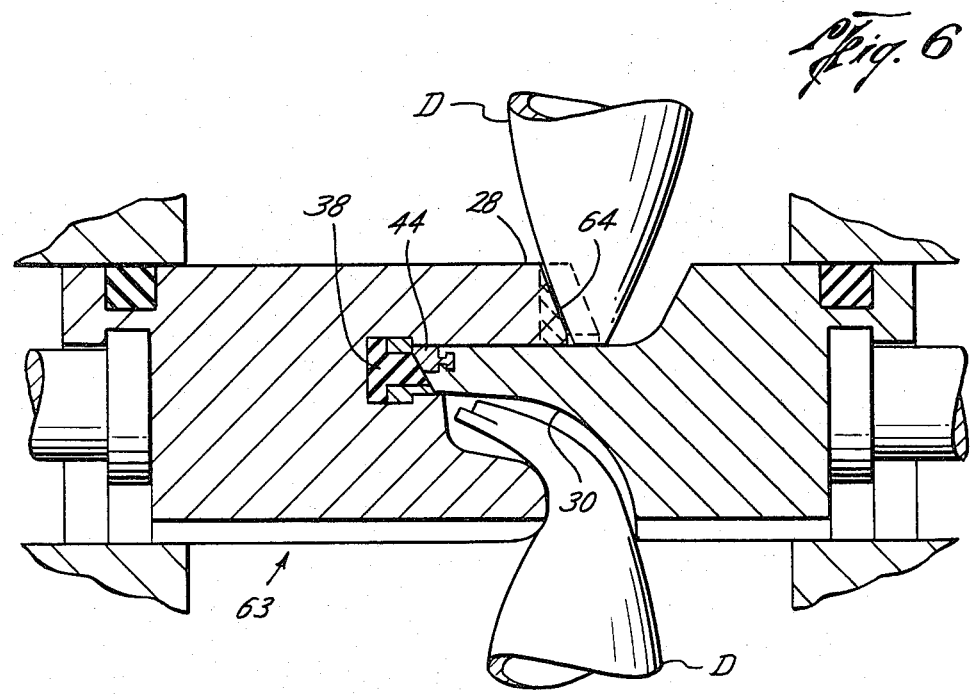
FIG. 6 is a detail sectional view of the shearing of a well pipe by the modified form of shearing apparatus shown in FIG. 5.

The modified form of shearing apparatus 63 shown in FIGS. 5 and 6 is substantially the same as shearing apparatus 10 and all components thereof have the same number designation as that of apparatus 10. The difference between the two forms is in upper cutting blade 28 which, in the form shown in FIGS. 5 and 6, does not include any hard metal inserts on its cutting edge but has its cutting edge flame hardened or electrically hardened as indicated at 64. In apparatus 63, hardened cutting edge 64 of upper blade 28 is isolated from the high pressure sour gas in the drilling fluids when the rams are closed. In both forms of the invention, sealing strips are provided in addition to sealing strip 38 to have a continuous seal along the sides and top of each ram against their guideways as is well known in the art and shown in U.S. Pat. No. 4,132,267.

Sulfide stress cracking of the hard metal cutting edges of the cutting blades is avoided because the hard metal is isolated from the sour gas when they are under stress as a result of their sealing across the well bore. At other times they are not under stress except momentarily during shearing of pipe. Such momentary stress is not likely to cause sulfide stress cracking.

What is claimed is:

1. A wellhead shearing apparatus comprising
    a body having a vertical bore therethrough and opposed guideways extending outwardly from the bore,
    a ram assembly having a first and a second ram, said rams being positioned in opposite guideways, one ram having an upper cutting blade extending toward and coacting with the lower cutting blade of the opposite ram,
    means associated with each ram for moving the rams into the bore to shear pipe in the bore and to seal across the bore and for retracting the rams from the bore to allow freedom of movement of pipe through the bore,
    said rams and said cutting blades being of steel having a maximum hardness of 26 Rockwell C,
    a recess extending across the face of the lower cutting blade and having an enlarged volume within said blade to present a shoulder therein facing away from the face of said blade,
    a hard metal insert positioned within said recess and forming the forward cutting edge for said blade,
    said insert substantially filling said recess to have an enlarged portion therein engaging said recess shoulder to retain said insert within said recess, and
    means providing a hard surface on the cutting edge of the upper cutting blade.

2. A shearing apparatus according to claim 1 wherein the hard surface cutting edge on the upper blade is provided by a hardening process.

3. A shearing apparatus according to claim 1 wherein the cutting edge on the upper blade includes
    a recess extending across the face of said upper blade and having an enlarged volume within said blade to present a shoulder therein facing away from the face of said blade,
    a hard metal insert positioned in said upper blade recess forming the forward cutting edge of said upper blade,
    said upper blade insert substantially filling said upper blade recess to have an enlarged portion therein engaging said recess shoulder to retain said insert within said recess.

4. A shearing apparatus according to claim 3 wherein each of the recesses in said cutting blades includes a T-shaped slot extending across its cutting blade, and
    each insert has a T-shaped projection positioned in its T-shaped slot.

5. A shearing apparatus according to claim 1 wherein said lower blade's recess includes a T-shaped slot extending across the lower cutting blade, and
    said insert has a T-shaped projection positioned in said slot.

6. A shearing apparatus according to claim 5 wherein the face of the upper cutting blade has a recessed V-shape, and
    said insert includes two inserts, one inserted into the recess and T-shaped slot from each side of said cutting blade.

7. A shearing apparatus according to claim 1 including
    a bonding agent securing said insert in said recess.

8. A shearing apparatus according to claim 1 including
    a seal extending across the face of the upper cutting blade ram below its cutting blade,
    said seal being positioned to be engaged at least partially by the face of the lower cutting blade below the lower blade insert upon closing of said ram assembly whereby said hard metal insert is isolated from the fluids in the bore below the ram assembly when the apparatus is sealing across the bore.

9. A shearing apparatus comprising
    a body having a central bore therethrough, opposed guideways extending out from the bore and means for connecting the apparatus in a wellhead stack,
    a ram assembly including a first and a second ram, said rams positioned in opposite guideways,
    each of said rams having a cutting blade extending toward and coacting with the cutting blade of the opposite ram, and having means connected to each ram for moving the rams into the bore to shear well pipe in the bore and to seal across the bore and for retracting the rams from the bore to allow freedom of movement of well pipe and fluids through the bore,
    said rams and said blades being of steel having a maximum hardness of 26 Rockwell C,
    each of said blades having a recess extending across its face and a T-slot in communication with the recess,
    hard metal inserts, each having a body and a T-shaped projection, inserted into the recesses and T-slots of said blades to provide the cutting edge for the blades,
    each of said inserts being secured in its recess and T-slot with an epoxy bonding agent,
    the inserts being substantially harder than the blades.

* * * * *